United States Patent [19]

McCaslin

[11] 4,206,495
[45] Jun. 3, 1980

[54] OPTICAL FIBER LIGHT DISPLAY

[76] Inventor: Robert E. McCaslin, 1227 Coldwater Canyon, Beverly Hills, Calif. 90210

[21] Appl. No.: 899,181

[22] Filed: Apr. 24, 1978

[51] Int. Cl.² .............................................. F21V 7/04
[52] U.S. Cl. ...................................... 362/32; 362/35; 362/84; 362/234; 362/800; 362/811
[58] Field of Search .................... 362/32, 35, 84, 234, 362/800, 811

[56] References Cited

U.S. PATENT DOCUMENTS 4,097,917  6/1978  McCaslin ............................... 362/32

Primary Examiner—Stephen J. Lechert, Jr.
Attorney, Agent, or Firm—John L. McGannon

[57] ABSTRACT

A light display made from a plurality of optical fibers. The fibers are secured to a tube and extend outwardly therefrom, the tube being mounted for reciprocation about an axis extending through the tube and longitudinally of the fibers. In one embodiment, the tube has an arm extending laterally therefrom and a rod coupled to the outer periphery of a rotatable member causes the arm to move back and forth along a curved path to reciprocate the tube and thereby the fibers as the member rotates in one direction. In a second embodiment of the light display, the tube is carried by one of a pair of relatively shiftable members each having a coil thereon so that a voltage applied to the coil of the other member will induce a voltage in the coil of the one member to thereby cause reciprocation of the one member relative to the other member about an axis through the members due to the alternating current "hum" responsive to the inductive coupling between the coils.

16 Claims, 4 Drawing Figures

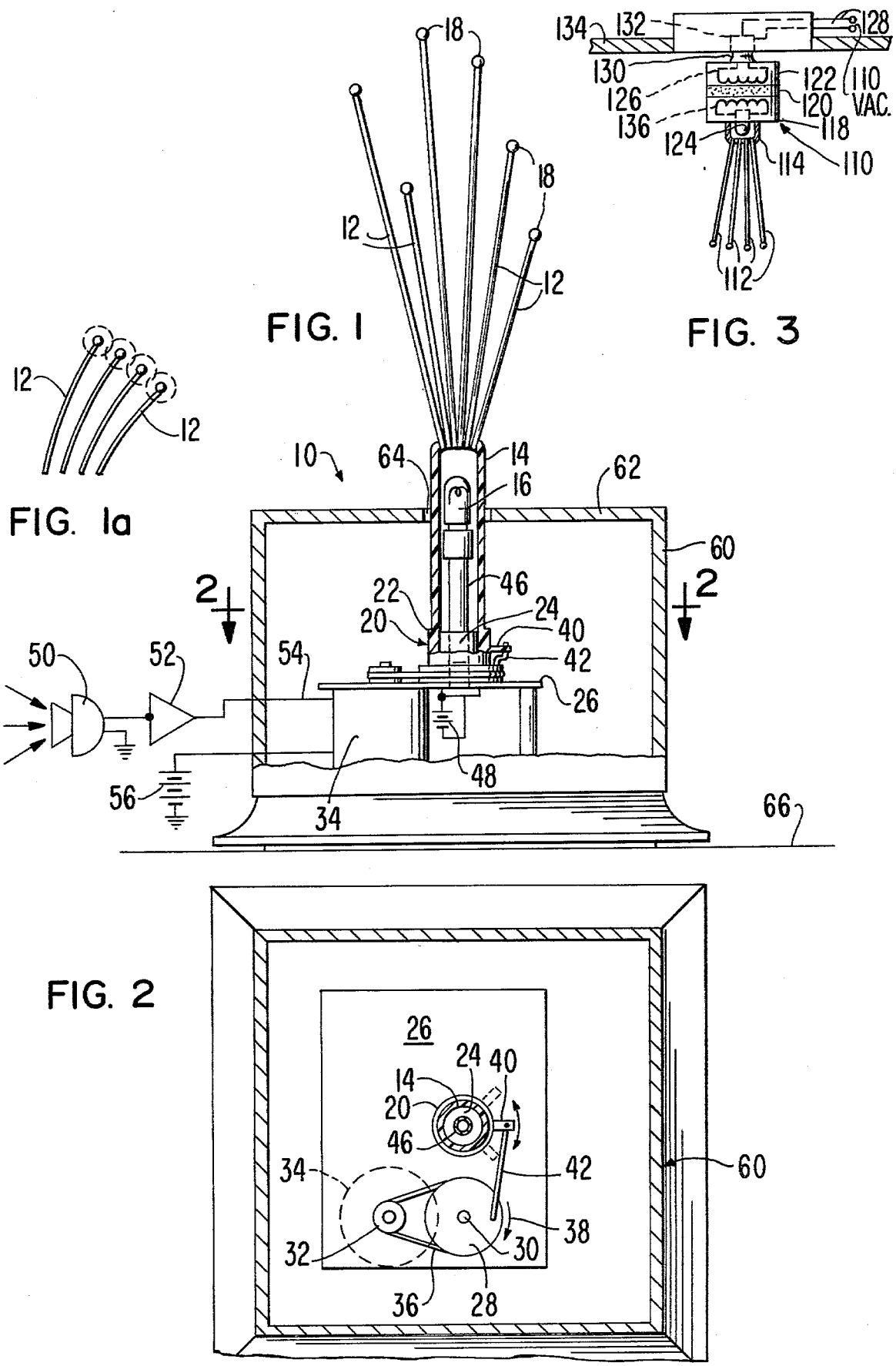

OPTICAL FIBER LIGHT DISPLAY

This invention relates to improvement in light displays of the type using fiber optics and, more particulary, to an improved light display having optical fibers which reciprocate and thereby provide unique light paterns at the outer ends of the outer optical fibers.

BACKGROUND OF THE INVENTION

Use of optical fibers to provide unique visual effects has been known in the past. For the most part, these have been limited to devices which rotate slowly in one direction causing the fibers merely to move slowly without any vibration due to their flexibility.

Another type of optical display is disclosed in pending U.S. application, Ser. No. 693,384, filed June 7, 1976 entitled "Rotatable Light Display". In this disclosure, optical fibers are secured to a tube which rotates only in one direction about a generally vertical axis either continuously or in response to external control signals, such as sounds. This particulary light display gives a unique effect; however, the effect is limited in the sense that the tube rotates only in one direction and as a result, the fibers themselves move only in one direction to provide a particular visual effect. Because of this limitation, a need has arisen for another type of light display which permits the optical fibers to reciprocate and thereby give other unique effects not capable of being acheived with the prior devices mentioned above.

SUMMARY OF THE INVENTION

The present invention is directed to a light display which satisfies the aforesaid need wherein the light display includes a tube having a group of optical fibers projecting outwardly therefrom and the tube is reciprocated about an axis extending longitudinally therethrough so that the outer ends of the fibers will decribe particular, unique visual designs depending upon the lengths of the fibers and the rate at which the tube is reciprocated.

Several embodiments of the light display of the present invention can be used. In a first embodiment, the tube has a lateral arm connected to a rod to the outer periphery of a rotatable member, such as a pulley coupled to a drive motor. As the motor is energized, the member rotates, causing the arm to move back and forth along a curved path to thereby reciprocate the tube and thereby the optical fibers. The fibers will reciprocate in unison if they are of the same lengths, thereby causing the outer ends to sweep out essentially circular paths. If the fibers are of different lengths, they will have different resonant frequencies and thereby will provide other specialized visual effects.

In the second embodiment of the invention, the tube extends outwardly from a member containing a first coil, the lower member being coupled by a yieldable layer of material, such as plastic foam or the like to an upper member, the latter also containing a coil. The coils being inductively coupled so that, when an alternating current is impressed on the second coil, a voltage is induced in the first coil which energizes a light bulb carried in the tube and the alternating current "hum" causes the lower member to reciprocate relative to the upper member about an axis extending through the tubes. This causes the fibers extending downwardly from the lower member to be reciprocated and depending upon the lengths of the fibers, will provide unique visual effects at the outer ends of the fibers.

The primary object of this invention is to provide an improved visual light display using optical fibers wherein the fibers are caused to reciprocate about an axis extending longitudinally of the fibers so that the outer ends of the fibers will sweep through respective paths which provide unique light patterns in space not available or acheived with prior devices.

Another object of the present invention is to provide a light display of the type described wherein the light display can be operated continuously or by the use of external sounds yet the fibers of the display will reciprocate to provide unique light patterns which can be controlled by the displacement caused by the reciprocation and by the lengths of the optical fibers.

Other obects of this invention will become apparent as the following specification progresses, reference being had to the accompanying drawing for an illustration of several embodiments of the invention.

IN THE DRAWING

FIG. 1 is a side elevational view, partly in section, of one embodiment of a rotating fiber optic light display of the present invention.

FIG. 1a is a rragmentary view of a number of optical fibers of this invention, shwoing the way the fibers move when they are of the same length;

FIG. 2 is a cross-sectional view taken along line 2—2 of FIG. 1; and

FIG. 3 is a side elevational view, partly in section, of a second embodiment of the light display of the present invention.

The first embodiment of the light display of this invention is broadly denoted by the numeral 10 and includes a plurality of optical fibers 12 secured to and extending outwardly from the upper closed end of an upright tube 14 mounted for rotation about a generally vertical axis through the tube in a manner to be described. A light bulb 16 in tube 14 near its upper end directs light to the lower exposed ends of fibers 12 so that the light can be directed outwardly to the outer ends of the fibers to present light sources at such outer ends. Each optical fiber 12 can have a mass or blob 18 of a colored material which accentuates the presence of the light at the outer end of the fiber and the blob can be of different colors to enhance the effect.

The lower end of tube 14 is secured to a bearing 20 having an outer race 22 rotatably mounted on an inner race 24. The inner race is secured rigidly to a base plate 26 having a pulley 28 rotatably mounted on a shaft 30 carried by plate 26 to one side of the axis of rotation of tube 14 as shown in FIG. 2. A second pulley 32 is mounted on the drive shaft of a drive motor 34 carried below plate 26, and an endless, flexible belt 36 interconnects the pulleys so that pulley 28 is rotated in the direction of arrow 38 (FIG. 2) when motor 34 is energized.

Outer race 22 of bearing 20 has a lateral arm 40 projecting to one side thereof and this arm is connected by a rod 42 to pulley 28 near the outer periphery of the latter. Thus, as pulley 28 rotates in the direction of arrow 38, outer race 22 of bearing 20 reciprocates about the vertical axis of tube 14 in the direction of arrow 44 (FIG. 2). This causes tube 14 to reciprocate and thereby reciprocates the optical fibers 12 to give a unique light display or pattern in space at the outer ends of the fibers when light bulb 16 is actuated.

Light bulb 16 is carried on the upper end of an inner tube 46 disposed within tube 14. Suitable electrical leads are connected to the light bulb 16 and to a battery 48 below plate 26 at any suitable location. A switch (not shown) is coupled with the battery and light bulb to control the actuation thereof.

Motor 34 can be actuated by external signals, random or otherwise, such as sound, light beams or other such signals. In the alternative, the motor can be connected directly to a voltage source so that it can operate continuously rather than in response to an external signal such as sound or light. As shown in FIG. 1, motor 34 is actuated by external sounds which are received by microphone 50 coupled to the input of an amplifier 52 which applies electrical signals by lead 54 to motor 34. A battery 56 forms part of the circuit containing microphone 50 and amplifier 52. If the input signal is sound, for instance, the signals applied to the motor will generally be of different durations and amplitudes, thereby causing the optical fibers to reciprocate at different rates. If they are of different lengths as shown in FIG. 1, the fibers will create different light patterns or designs in space because they will have different resonant frequencies. In the alternative, if the optical fibers are of the same length, they tend to move in unison and the outer ends sweep out essentially circular paths indicated by dashed lines in FIG. 1a. Other unique visual effects can be achieved with other arrangments of the fibers.

Display 10 is mounted in any suitable manner. For purposes of illustration, the display is mounted in a housing 60 having a top 62 provided with a hole 64 therethrough. Tube 14 extends through the hole and upwardly from top 62. Base plate 26 and motor 34 are mounted in any suitable manner within the housing and the latter can be placed on a table or other supporting surface 66 for operation.

Another embodiment of the reciprocal light display of the present invention is broadly denoted by the numeral 110 and is illustrated in FIG. 3. It includes a number of optical fibers 112 secured to the lower closed end of a tube 114 mounted on the lower surface 116 of a lower base member 118 secured by a yieldable layer 120, such as foam rubber or plastic foam, to an upper base member 122. A light bulb 124 carried by lower member 118 extends into tube 114 and supplies the light for the exposed upper ends of optical fibers 112.

Member 122 has a primary coil 26 therein which, through leads 128 is coupled to a source of alternating current, such as a 110 volts A.C. source. To this end, member 122 may have a threaded base 130 which is threaded into a conventional light socket 132 in the ceiling 134 of a room.

Member 118 has a secondary coil 136 which is inductively coupled to coil 126 through layer 120. Thus, when primary coil 126 is energized by applying an A.C. voltage thereto, an A.C. voltage is induced in coil 136 which supplies the current to operate light 124. Also, when primary coil 126 is energized, the inductive coupling of the coils causes lower member 118 to vibrate at a frequency of 60 Hz. about a generally vertical axis passing through members 118 and 122. The reason for this vibration is that layer 120 is yieldable and the 60 Hz. "hum" associated with the inductive coupling causes lower member 118 to reciprocate about a vertical axis relative to member 122. This reciprocation of member 118 causes fibers 122 to reciprocate and to present a unique light pattern of design in space depending upon the lengths and displacement of fibers 112.

While light display 110 is shown as being coupled in a ceiling 134, it is clear that display 110 can be coupled to a sidewall or to an inclined wall to give other unique visual effects.

I claim:

1. A light display comprising: a plurality of optical fibers; a tubular member having a closed end, the fibers being secured to the closed end of the tube and extending outwardly therefrom with the inner ends of the fibers being in light communication with the interior of the tube; means mounting the tube for reciprocation about an axis extending through the tube and longitudinally of the fibers; means coupled with the tube for reciprocating the same about said axis through an arc less than 360°; and means defining a light source in the tube for directing light onto the inner ends of the fibers so that the light will travel through the fibers to the outer ends thereof.

2. A light display as set forth in claim 1, wherein the tube is mounted for reciprocation about a generally vertical axis.

3. A light display as set forth in claim 2, wherein the closed end of the tube is at the upper extremity thereof, the fibers extending upwardly from the tube.

4. A light display as set forth in claim 2, wherein the closed end of the tube is at the lower extremity thereof, the optical fibers extending downwardly from the tube.

5. A light display as set forth in claim 1, wherein the tube has an arm extending laterally therefrom, and means coupled with the arm for moving the same along a curved path between a pair of limit positions.

6. A light display as set forth in claim 5, wherein said moving means comprises a rotatable member having an outer periphery, and a rod connecting the arm to the member adjacent to the outer periphery thereof and means coupled with said member for rotating the same in one direction.

7. A light display as set forth in claim 1, wherein said moving means includes an upper part, a lower part, and yieldable means interconnecting the parts for allowing the lower part to reciprocate relative to the upper part about an axis extending through the parts, and means coupled with the lower part for shifting it relative to the upper part.

8. A light display as set forth in claim 7, wherein each of the parts has a coil therein, the coils being inductively coupled with each other, the coil in the upper part adapted to be coupled to a source of alternating current, whereby a secondary voltage will be induced in the coil in the lower part and the lower part will reciprocate relative to the upper part due to the inductive coupling between the coils.

9. A light display as set forth in claim 8, wherein the tube extends downwardly from the lower part, the light source being in the tube and electrically coupled with the coil of the lower part.

10. A light display as set forth in claim 1, wherein said moving means comprises a motor, there being means coupled to the motor for applying external control signals thereto for energizing the motor.

11. A light display as set forth in claim 10, wherein said applying means comprises a microphone for receiving external sounds.

12. A light display as set forth in claim 1, wherein the lengths of the fibers are different from each other.

13. A light display as set forth in claim 1, wherein the lengths of the fibers are the same.

14. A light display comprising: a base plate; a tube; a bearing mounting the tube on the base plate for rotation about a generally vertical axis; a drive motor carried by the base plate and having a drive shaft; a drive member coupled to the drive shaft of the motor and rotatably mounted on the base plate in spaced relationship to the tube, said drive member being rotated when said motor is energized; a rod coupled at one end thereof to the drive member in spaced relationship to its axis of rotation, the opposite end of the rod being coupled to the tube for moving the latter back and forth about said axis through an arc less than 360° in response to the rotation of the drive member in one direction; a light source in the tube near the upper end thereof; and a plurality of optical fibers secured to the upper end of the tube and extending upwardly therefrom, the lower ends of the fibers being in light communication with the light source in the tube, whereby light will travel through the optical fibers to the outer ends thereof.

15. A light display as set forth in claim 14, wherein is provided means responsive to external sounds for applying signals to the drive motor.

16. A light display comprising: a tube having a lower closed end; a plurality of optical fibers secured to the lower end and extending downwardly therefrom, the upper ends of the fibers being in light communication with the interior of the tube; a lower member having a first electrical coil thereon, the upper end of the tube being coupled to the lower member; a light bulb carried by the lower member and extending into the tube, the first coil being electrically connected to the light bulb; an upper member adapted to be coupled to a fixed support, the upper member having a second coil thereon, the coils being inductively coupled with each other; and a layer of yieldable material interconnecting the upper and lower members to permit the lower member to reciprocate relative to the upper member about a generally vertical axis through the members, the second coil adapted to be coupled to a source of alternating current to cause a voltage to be induced in the first coil as a voltage is applied to the second coil.

* * * * *